Jan. 3, 1939.  C. A. TOUT  2,142,223
APPARATUS FOR MAKING LATEX INNER TUBES AND THE LIKE
Filed Jan. 11, 1935  5 Sheets-Sheet 1

INVENTOR:
CHARLES A. TOUT
BY Herman Eisele
ATTORNEY

Jan. 3, 1939.  C. A. TOUT  2,142,223
APPARATUS FOR MAKING LATEX INNER TUBES AND THE LIKE
Filed Jan. 11, 1935  5 Sheets-Sheet 5

INVENTOR:
CHARLES A. TOUT
BY Herman Eiele
ATTORNEY

UNITED STATES PATENT OFFICE 2,142,223

APPARATUS FOR MAKING LATEX INNER TUBES AND THE LIKE

Charles A. Tout, Butte, Mont.

Application January 11, 1935, Serial No. 1,428

17 Claims. (Cl. 154—9)

This invention relates broadly to apparatus for forming articles of latex directly from a liquid dispersion of latex. More specifically this invention relates to the formation of such articles by a deposition and coagulation of the liquid latex, and in some applications, to the further conformation of the coagulated latex to produce articles of the desired shape. In its still more specific adaptation this invention relates to the formation of annular articles of latex directly from liquid latex, and still more particularly, in the disclosed embodiment, to the formation of hollow annular articles such as inner tubes for pneumatic tires and the like.

Latex, as is well known to those skilled in the rubber industry, is a natural sap which comes from the rubber tree and is an emulsion or dispersion of microscopic particles of rubber in a serum about 95% of which is water. This "liquid latex" may be diluted with water and dehydrated quite readily, but once dried into pale crepe or rolled into smoked sheets, by which process this liquid latex is now most frequently converted into rubber, it is no longer soluble in water.

As is well known, in order to remove the impurities which are introduced into the rubber in this usual process of drying and in shipping, and in order to effect the compounding of the rubber and to thoroughly mix the compounding materials, it is necessary to mill and re-mill the rubber on heavy rolls which breaks the "nerve" in the rubber and seriously affects its physical properties.

It is obvious that compounding of the rubber can be more effectively and more economically done in liquid than in solid form, and that the product resulting directly from the liquid latex without the intervening milling and related operations, is far superior in strength, diffusion rate, grain structure, aging characteristics and many other properties.

In view of these advantages many articles are being made directly from suitable compounds of liquid latex. The methods most frequently used are dipping, extrusion into a coagulating fluid, and similar processes. These processes have not, however, been successful in the production of inner tubes and similar hollow annular shapes.

Attempts have been made to form inner tubes from latex sheets and by other methods and, when thus made, these tubes embodied the very superior properties of latex referred to above. Such latex tubes are very difficult to make and therefore very expensive, however, because of the special treatment and care which must be exercised with present known methods.

One of the characteristics of latex which has an important bearing on this problem is the following: If two latex surfaces, while still saturated with liquid in the formative or nascent state, are placed in contact and allowed to dry they will be united firmly and actually fused or welded together in an integral union. For this reason it is desirable to complete the forming and seaming of the tube while the latex is still in the moist nascent state, and this makes the manipulation very difficult. If, on the other hand, the material is allowed to dry to a consistency which permits handling, the natural adhesiveness of the latex is destroyed and the seam, in the case of an inner tube, must be buffed and cemented, as is now standard practice with milled rubber, with all the inherent defects of such joints.

Having in view the advantages of inner tubes and similar articles when formed directly from liquid latex and in order to overcome the difficulties in present known methods, I have developed and successfully produced the improved product and practiced the improved method and used the apparatus hereinafter described.

One object of this invention is therefore to provide apparatus for forming completely sealed inner tubes and the like, directly from a suitable compound of liquid latex.

Another object of this invention is to provide apparatus for carrying out a method for the formation of a nipple stem or nipple base from liquid latex simultaneously and integrally with the body of the latex tube.

A further object of this invention is to provide apparatus in which the several steps required for the completion of the tube from the feeding of the liquid latex to the completion of the formation of the tube may be performed entirely in a single machine.

A further object of this invention is to provide a machine of this type which produces a completely formed tube the exterior surface of which has been dried sufficiently to permit ready handling and which is substantially ready for the vulcanizing operation.

Another object of this invention is to provide apparatus for forming a completely sealed inner tube in which air is automatically entrapped in the tube when the sealing of the tube is effected, which will effectually prevent the collapse of the tube while handling and transporting prior to vulcanizing, thus providing a "mandrel" of air.

Another object of this invention is to provide apparatus for forming a latex tube which will permit additional air under controlled pressure to be introduced into the sealed tube either prior to or subsequent to the removal of the sealed tube from the machine.

Another and more specific object of this invention is to provide simplified apparatus adapted to form a single annular seam or more properly "union" at the inner periphery of an inner tube.

A further specific object is to provide apparatus for carrying out a method by which this single annular union may be formed while the latex is still moist, that is, while the latex is still in the nascent or incompletely solidified state.

Another object of this invention is to provide an apparatus for forming a substantially annular band of latex directly from liquid latex by the use of centrifugal force.

A further object of this invention is to provide apparatus for practicing a method of producing a rubber nipple stem and base directly from liquid latex by centrifugal force in a form substantially ready for vulcanizing.

Another object is to produce an apparatus capable of producing a laminated latex sheet, band, or tube, that is a latex in which successive layers of liquid latex may be successively coagulated and formed into an integral layer of the required thickness.

Another object is to provide an apparatus of the class described which will be simple, economical and efficient in operation and inexpensive and durable in construction.

Further objects and advantages of this invention will appear from the following description and from reference to the accompanying drawings. These annexed drawings and description set forth in detail certain means and methods embodying this invention, such disclosed means and methods constituting, however, but a few of the forms in which the principle of this invention may be applied.

In said annexed drawings:

Fig. 7 is a plan sectional view through the apparatus, this view being taken on the plane indicated by line 7, 7 in Fig. 1.

Fig. 8 is another plan sectional view through the apparatus, this view being taken on the plane indicated by line 8, 8 in Fig. 1.

Fig. 9 is an enlarged detail view through the valve stem and valve stem forming structure shown in Fig. 1.

Fig. 10 is a view similar to Fig. 9 showing a modified form of the construction of the valve stem structure.

Fig. 11 is a view showing an alternative construction in which a thickening of the latex band is formed at the location for the valve, this construction being used for those tubes which are not intended to be formed with integral latex valve stems and in which an aperture is subsequently formed to receive brass valve stems of standard well known types.

Fig. 12 is a view similar to Fig. 9 showing a form of construction of valve mounting in which a brass valve stem of usual type is imbedded in the latex tube simultaneously with the formation of the tube.

Fig. 13 is a section taken on the plane indicated by the line 13, 13 in Fig. 12.

The terms "liquid latex", "liquid dispersion of latex" or "latex emulsion", where they appear in the specification and claims, are assumed to include any suitable solution, emulsion, or aqueous dispersion of india rubber, gutta percha, balata, or like materials, or any suitable compound of these materials with any desired vulcanizing or other ingredients. The term "latex" is to be understood to designate any solid or semi-solid form of the above materials. The terms "coagulant", "coagulating medium" or "coagulating fluid" as used in these specifications and claims is intended to include any liquid, powder, gas, or other agent which is capable of coagulating the liquid latex into a curd-like or thickened consistency and/or which converts the liquid latex into a semi-solid mass which permits the carrying out of the subsequent steps of the method herein described. The term "nascent" as used in these specifications and claims in reference to the state of latex designates that state in the formative process of the latex in which the latex is a cohesive integral body which is resilient and tenacious to some extent, but which is still sufficiently moist to fuse with and form an integral union with similar latex under pressure.

*Description of apparatus*

Figures 1, 2, 3:
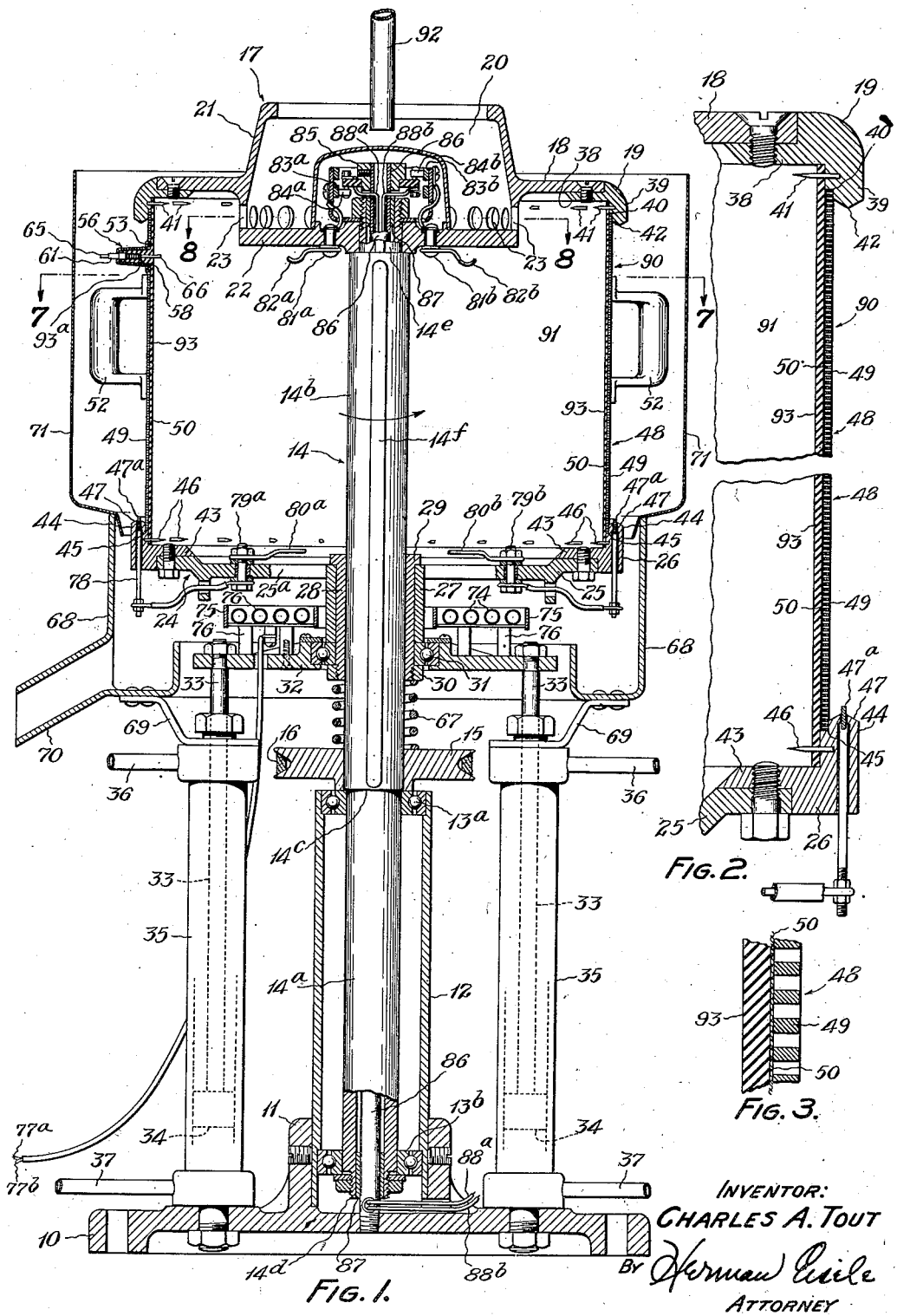
Fig. 1 is an axial section, to reduced scale, through this improved apparatus, this view showing the apparatus at the completion of the initial steps of the herein described improved process in accordance with which steps a layer or band of coagulated latex has been positioned upon the inner surface of a foraminous cylindrical member.
Fig. 2 is an enlarged view of a portion of Fig. 1 showing particularly the foraminous wall and the layer or band of coagulated and partially dehydrated latex positioned upon the inner surface of the wall, and also showing the construction and conformation of certain anvils outwardly adjacent the wall.
Fig. 3 is a still further enlarged view of a portion of Fig. 2 showing the perforated plate and adjacent screen, forming the foraminous wall, in relation to the layer of coagulated and partially dehydrated latex.

I shall first describe the novel apparatus in which my improved method is used, and with particular reference first to Fig. 1. In this figure, 10 indicates the base of the apparatus which is securely anchored to the floor or other suitable support. Projecting upwardly from the base is a hollow boss 11 in which is mounted a vertical tubular housing 12. Rotatably supported in this housing by means of a pair of suitably supported spaced ball bearings 13a, 13b is a vertically disposed hollow spindle indicated generally at 14.

As will appear from the drawings, the lower portion 14a of the spindle 14 is of slightly smaller outside diameter than the upper portion 14b whereby a shoulder 14c is formed which rests upon the inner race of the upper ball bearing 13a and which serves to support the weight of the spindle and the load supported by the spindle. The extreme lower portion of the spindle is formed with an extension 14d of reduced diameter provided with a thread as shown upon which are mounted a pair of nuts engaging the inner race of the ball bearing 13b to prevent the spindle from rising vertically when rotating at a high rate of speed.

Fixedly mounted upon the lower end of the spindle portion 14b is a pulley 15 of any desired type driven, for example, by a belt indicated at 16. This belt is preferably driven by means of a variable speed drive actuated by any type of motor, both of which are not shown as they form no part of the present invention. Any type of driving means may be employed which will be capable of producing speeds and power responsive to the requirements of the apparatus. It will also be understood that suitable braking appliances may be applied to the spindle or may be provided in the drive, to bring the rotation of the machine to a stop with the desired degree of rapidity.

The spindle 14 is formed at its upper end with a reduced portion 14e upon which is fixedly mounted an upper head indicated generally at 17. This upper head is preferably formed with a central portion 18 and a flange portion 19, rigidly secured together by spaced screws as shown or by any other desired means. The central portion 18 is provided with a distributing chamber 20 formed by a generally conical side wall 21 and a bottom wall 22. The side wall is intersected by spaced openings 23, the bottom of the openings being aligned with the upper surface of the bottom wall 22.

Mounted upon the portion 14b of the spindle 14 is a lower head indicated generally at 24. This head consists of a central portion 25 and a flange portion 26 suitably secured together by screws as shown or by any other desired means. The central portion is formed with a relatively large hub 27 mounted upon a sleeve 28. This sleeve is slidably mounted on the spindle portion 14b and is formed with a pair of opposed grooves sliding upon splines 14f, Fig. 7, mounted in the spindle and extending substantially for the full length of the portion 14b. The upper end of the sleeve 28 is formed with a shoulder 29 and the lower portion is formed with a thread engaged by a nut 30. The hub 27 and the inner race of a suitable ball bearing 31 are frictionally clamped between the shoulder 29 and the nut 30. The outer race of the ball bearing 31 is supported in a plate 32 which is in turn rigidly connected with and supported by the upper ends of a pair of piston rods 33 disposed on opposite sides of the spindle 14 as shown. These piston rods are actuated by suitable pistons 34, shown in broken lines, and are mounted in cylinders 35 rigidly mounted on the base 10. Each cylinder is provided at its upper end with a pipe 36 and at its lower end with a pipe 37, these pipes each being connected to a suitable source of hydraulic or pneumatic pressure and to suitable valve mechanism, not shown, by which the pistons 34 may be raised or lowered in accordance with the requirements of the functioning of the apparatus.

The flange portion 19 of the upper head 17 is formed with a horizontal annular wall 38, Figures 1 and 2, and with a cylindrical downwardly projecting annular lip 39 formed at its inner lower periphery with an annular recess 40. In the inner wall of the lip 39, at points adjacent the upper end of the annular recess 40 and spaced from the bottom of the horizontal annular wall 38 are a plurality of anchoring pins 41. Exteriorly of and below the recess 39 is a circular anvil 42 shown integrally formed with the lip 39 but which may be renewably inserted in the lip 39 if desired.

The flange portion 26 of the lower head 24 is formed with a horizontal annular wall 43 and with a cylindrical upwardly projecting lip 44 formed at its inner upper periphery with an annular recess 45. In the inner wall of the lip 44 at points adjacent the lower end of the annular recess 45 and spaced from the horizontal annular wall 43 are a plurality of anchoring pins 46. Exterior of and above the recess 45 is a circular anvil 47 and knife 47a which is rigidly but renewably mounted in the anvil 47 and which is electrically insulated therefrom, and which is formed of electrical resistance material.

Interposed and removably mounted between the upper head 17 and the lower head 24 and removably seated in the annular recesses 40 and 45 respectively, is a segmental foraminous wall indicated generally at 48 as shown in Figures 1, 2, 3, and 7, and forming with said heads a substantially cylindrical drum indicated generally at 90 and forming a chamber 91. This foraminous wall in the embodiment illustrated, consists of a plurality of suitably perforated rigid segmental plates 49 made of suitable material and lined inside with a filtering medium 50 preferably made of silk of fine mesh or other equivalent filtering material, suitably secured to the inner surface of the plates 49. This foraminous wall is accordingly adapted to permit water and other liquids to be extracted by centrifugal force and to retain the semi-solid particles of the latex. These segmental plates are preferably made in two semi-cylindrical segments and form abutting joints as indicated at 51, Fig. 7. Each of the segments of these cylindrical plates is provided with a handle 52 to facilitate their manual removal and remounting in the apparatus, as will be hereinafter described.

One of the segmental plates 49 is formed with a circular seat 53, Figures 1 and 9, at the point at which it is desired to locate the valve stem in the tube to be formed in this machine. This circular seat 53 is located slightly radially outwardly from the cylindrical plane of the plates 49 and is joined with the main portion of the plate 49 by the gradually tapering portion 54 as clearly shown in Fig. 9. The seat 53 is centrally perforated with an opening 55. A preferably tapered thimble for forming the valve stem, indicated generally at 56, is formed with a perforated and preferably conical side wall 57 made of suitable material similar to that of the plates 49, and is lined with a filtering medium 57a similar to the silk filter 50. This thimble is formed with a flange 58 at its inner end. This thimble is inserted through the opening 55 from the interior of the plate 49 until the flange 58 engages the seat 53 in which position it is frictionally held by the engagement of the outer periphery of the flange 58 with the inner end of the tapered portion 54 or by the frictional engagement of the outer wall 57 with the opening 55 or by any other suitable means. The outer end of the thimble 56 is formed with a shoulder 59 surrounding an opening 60 adapted to receive the threaded portion 61 of a nipple. This shoulder 59 is adapted to engage the slightly enlarged portion 62 formed in the nipple whereby the nipple is prevented from moving outwardly. Any other suitable means may be provided for temporarily holding the nipple in place until it is permanently held in place by the coagulated latex. The inner end of the nipple is formed with the usual teeth 63 or other suitable roughened surface to form a secure bond between the latex and the nipple. The interior of the portion 61 of the nipple is formed with thread adapted to receive a temporary plug 64 formed at its outer end with a squared shank extension 65 and at its inner end with substantially cylindrical core pin 66 projecting inwardly for a substantial distance beyond the inner face of the plate 49. This pin is adapted to core or form a passage extending from the nipple to the interior of the tube through the latex stem or nipple base 93a as clearly shown in Figures 9, 1, 4, 5, and 6.

The foraminous wall 48 may be held in position between the upper head 17 and the lower head 24 by means of pressure exerted upon the lower head 24 by the pistons 34 and associated mechanism. I prefer, however, to hold the foraminous wall in position between the heads by means of a spring 67 interposed between the pulley 15 and the sleeve 28 which resiliently presses the lower head 24 upwardly against the bottom of the foraminous wall 48 and which, in turn, holds the wall in position in the recess 40 in the upper head.

A circular liquid collecting trough 68 is mounted exteriorly of and below the normal position of the lower head. The purpose of this trough is to collect liquid passing through the foraminous wall during the use of the machine, as will be described. This trough is supported on a pair of brackets 69 which are secured in any desired manner to a stationary portion of the apparatus as, for instance, to the heads of the cylinders 35. The trough 68 is formed with a spout 70 which is adapted to discharge the liquid collecting in this trough.

A splash jacket or shield, 71 is removably mounted upon the upper edge of the trough 68, and has a depending lip disposed interiorly of the edge to effect the proper draining of liquid from the jacket to the trough, and to insure the proper positioning of the jacket relatively to the trough and machine. This splash jacket 71 serves the purpose of collecting liquid thrown outwardly from the rotating foraminous wall and of delivering this liquid to the trough 68. In order to facilitate the frequent removal of the splash jacket, as becomes necessary in the disclosed embodiment of this invention, the jacket 71 is made in two halves hinged at 72 (Fig. 7) and may if desired, be provided with latches 73 or other suitable connecting elements.

As is clearly shown in Fig. 7 the central portion 25 of the bottom head 24 is of spoked construction being formed with six relatively narrow spaced spokes 25a as clearly shown. This construction permits the entrance of air into the bottom of the chamber 91 as will be understood.

Located immediately below the open portion of the head 24 is a source of heat adapted to heat the air entering the bottom of the chamber 91 to any desired temperature. This source of heat preferably consists of a plurality of electrically energized heating elements 74 mounted in a frame 75 which is in turn supported on the plate 32 by means of insulating spacers 76. The elements are energized by suitable conductors 77a and 77b.

The current carried by these conductors is controlled exteriorly of the machine and may be automatically and variably controlled in timed relation with the operation of the machine to produce variable amounts of heat at the different stages of the operation as will be understood. It will be evident that the heating elements, being mounted upon the plate 32, will always be located in the same position relative to the lower head 24 regardless of the vertical position of the head on the spindle 14.

As is shown in Figures 1 and 3, the circular knife 47a is electrically connected with a pair of vertically disposed electrically insulated conductor bars 78, preferably located at diametrically opposed points on the insulated knife. Each of these bars 78 is electrically connected by suitable conductors, in any desired manner, with a pair of spaced terminals 79a and 79b mounted in, but insulated from, the central portion 23 of the head 24. Attached to and projecting laterally from each terminal is a resilient contactor indicated at 80a and 80b.

Mounted in the central portion 18 of the upper head 17 and insulated therefrom, are a pair of spaced terminals 81a and 81b to each of which is attached a laterally projecting resilient contactor, as shown at 82a and 82b. The contactors 82a and 82b are vertically juxtaposed to the contactors 80a and 80b respectively and are spaced from each other a slightly less distance than the distance between the knife 47a and the anvil 42, whereby the contactors may engage each other when the knife 47a and anvil 42 reach a predetermined position adjacent each other.

The terminals 81a and 81b are each connected in any desired manner with one of a pair of spaced collector rings 83a and 83b. These rings 83a and 83b respectively are contacted by the brushes 84a and 84b mounted upon and insulated from a stationary collar 85 secured to the upper end of a tube 86 fixedly mounted in the base 10 as clearly shown in Fig. 1. The tube 86, as shown, passes through the central opening in the hollow spindle 14 and is held centrally in said opening by means of a pair of spaced bushings 87, 87. The brushes 84a and 84b are connected respectively to conductors 88a and 88b which pass downwardly through the tube 86 and outwardly through an opening adjacent the base thereof as shown.

It will be evident from the construction shown and described that current applied to the conductors 88a and 88b will heat the electrically insulated resistance element 47a when the contactors 80a and 80b engage contactors 82a and 82b.

The current to the conductors may permanently be applied to the conductors 88a and 88b so that current will heat the knife 47a as soon as the contactors 80a and 80b engage the contactors 82a and 82b, or if desired, the current to the conductors 88a and 88b may be separately controlled, either manually or in timed relation with the machine, whereby the supplying of the current to the knife 47a is delayed until after a predetermined period of time subsequent to the abutting of the knife 47a and the anvil 42.

The electrical collector ring mechanism just described is protected by a hood 89 as shown.

A plurality of stationary or shiftable supply pipes are associated with this apparatus as will be understood, for the purpose of supplying the liquid latex, coagulants, etc. The discharge end of one of these supply pipes is indicated at 92 and this pipe co-operates with the hood 89 to effect the uniform distribution of the supplied liquid to the distributing chamber, as will be apparent. Suitable controlling valves and measur-

Operation

The improved method of forming a latex inner tube and the preferred operation of the disclosed apparatus will now be described.

At the beginning of the cycle the parts of the apparatus are in the positions indicated in Fig. 1 of the drawings, the foraminous wall 48 being in place between the spaced heads 17 and 24 as shown. It is to be noted, however, that Fig. 1 shows the conditions subsequent to the feeding of liquid latex into the chamber 91 and that the layer of latex shown against the inside of the foraminous wall is not present in the apparatus at the beginning of the operating cycle.

At the beginning of the cycle, therefore, the driving mechanism is actuated to rotate the spindle and in unison with it the spaced heads 17 and 24 and interposed foraminous wall 48, comprising the drum 90. This initial rotational speed of the drum 90 is relatively high.

This operation being assumed to start with a dry apparatus a suitable quantity of coagulant is introduced into the distributing chamber 20 after the drum has reached full speed, this coagulant being centrifugally deposited upon the foraminous wall 48 and gravitationally fed downwardly until the foraminous wall is completely saturated with coagulant. This preliminary saturation is carried out to prevent the liquid latex, subsequently to be introduced, from adhering to the foraminous wall. The coagulant used may be any suitable coagulating medium such, for instance, as acetic acid or acetic acid salts.

A measured quantity of liquid latex is then fed through a pipe, as at 92, into the distributing chamber 20 and preferably centrally upon the hood 89 in order that the liquid latex may flow substantially uniformly around the entire periphery of the distributing chamber. This liquid latex then passes through the spaced openings 23 into the chamber 91 where it is centrifugally deposited in a cylindrical layer of uniform thickness, as shown at 93, upon the entire inner face of the foraminous wall 48 and upon the inner surface of the lips 39 and 44 on the upper and lower heads adjacent the upper and lower ends of the foraminous wall 48. It will also be noted that the liquid latex also flows into the cavity within the thimble 56 which is provided to form the latex stem or nipple base 93a integral with the body of layer 93. As will be noted, the liquid latex is introduced into the chamber at a point near the upper end thereof and gravity accelerates the uniform downward distribution of the latex along the foraminous wall. The extreme outer surface of this layer 93 having contacted the coagulant on the foraminous wall, is sufficiently coagulated into a semi-solid latex to prevent its passage through the filter screen 59 of the foraminous wall, and thus also serves to prevent the interior uncoagulated liquid latex from being centrifugally discharged through the wall and maintains uniformity of the thickness of the layer of liquid latex.

A measured quantity of coagulant is then introduced into the chamber 91, preferably through the distributing chamber 20, which is centrifugally deposited uniformly over the entire inner surface of the layer 93. This coagulant at once, progressively coagulates the liquid latex from the inside toward the outside, the layer being maintained uniformly distributed by the centrifugal force of rotation during this coagulation. The liquid released by the coagulating action is centrifugally extracted through the foraminous wall leaving a cylindrical band of semi-solid latex. In this state this semi-solid latex is pervious to the passage of clear liquid and air, and readily permits the passage of air which aids the further dehydration and drying of the semi-solid latex. This coagulating, dehydrating, and drying may be effected without heat, but it is preferably accelerated by feeding heated air into the bottom of the chamber 91, which may be effected by means of the electrical heating elements 74, which heat the air rising into the chamber and passing outwardly through the foraminous wall.

The continued centrifugal dehydrating and air drying of this semi-solid latex produces a cohesive integral band of latex which is resilient and tenacious to some extent but which is still moist and not completely set and is therefor in the formative or nascent state. The rotation of the drum is continued until the band reaches the desired consistency and this only requires a short time. I have found that, under proper conditions, the time required from the introduction of the liquid latex into the chamber until the band reaches a suitable consistency is only approximately a minute.

At this stage of the operation the rotation of the drum 90 is interrupted, the splash jacket 71 is removed and the lower head 24 is moved downwardly by means of the fluid pressure cylinder mechanism against the resilient pressure of the springs 67, for a distance sufficient to permit the removal of the foraminous wall between the anvil 42 and the knife 47a in an outwardly direction.

The segments of the foraminous wall are then removed, which operation is facilitated by the handles 52 provided for this purpose. The position of the apparatus just subsequent to the removal of the foraminous wall 48 is clearly shown in Fig. 4.

It will be noted that the nascent latex is imbedded around the anchoring pins 41 and 46 on the heads 17 and 24 respectively and that the upper and lower ends of the layer 93 are sufficiently tenacious to permit the latex band to be stretched, when the head 24 is lowered as indicated. This stretching also loosens any partial adhesion which may exist between the outer face of the latex layer 93 and the inner face of the foraminous wall 48, thus easing the removal of the wall segments.

Figure 4:
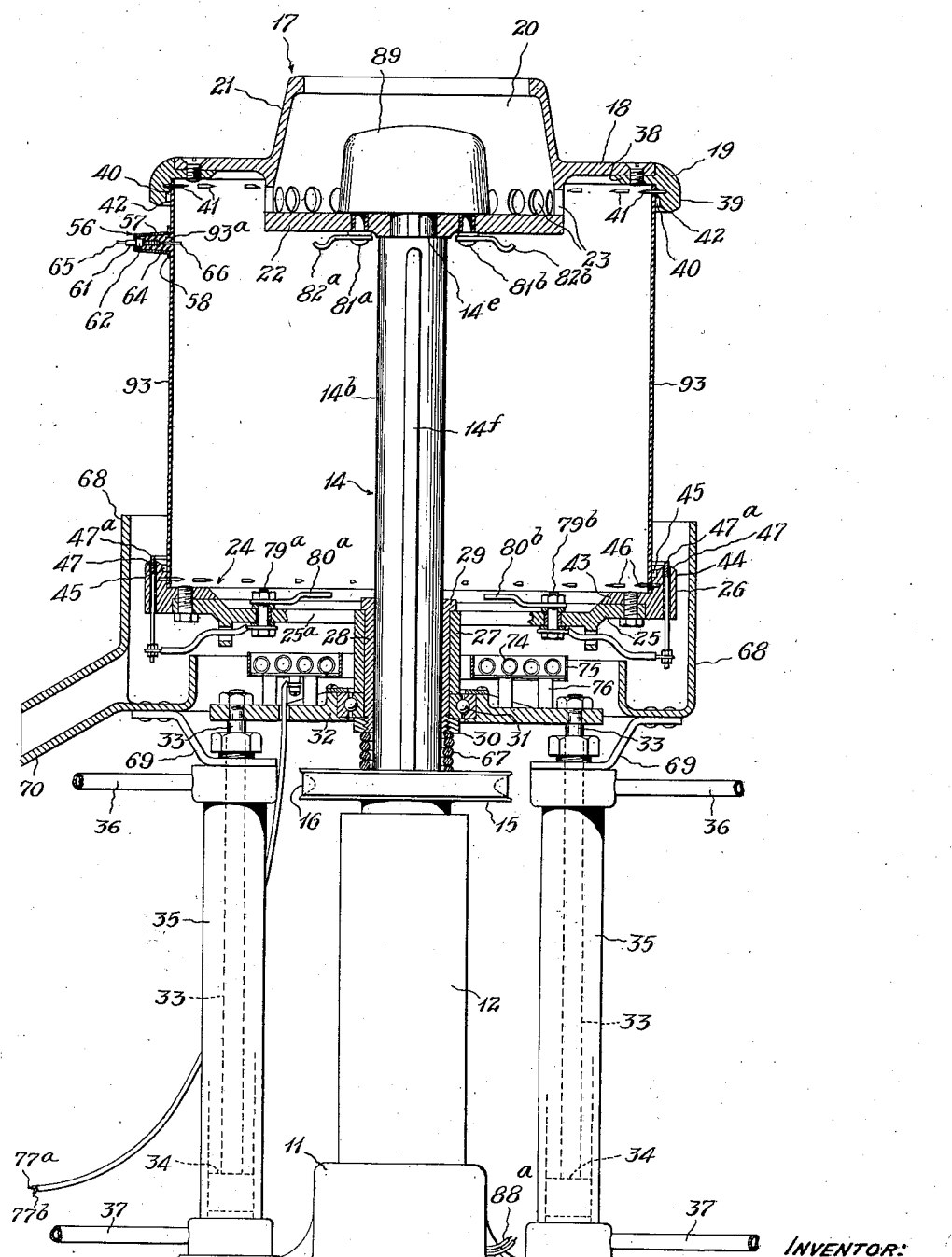
Fig. 4 is a view similar to Fig. 1 showing, however, certain splash shields and the foraminous cylindrical wall removed from the machine.

In removing the portion of the foraminous wall shown at the left in Fig. 1, it is preferred to leave the valve thimble 56 in position on the stem or base 93a, as shown in Fig. 4, which may easily be accomplished by pressing inwardly adjacent the outwardly projecting extension 65 with the thumb, when removing the wall, thus releasing the thimble 56 from its seat in the wall. This thimble may then readily be removed subsequently from the stem 93a.

Figure 5:
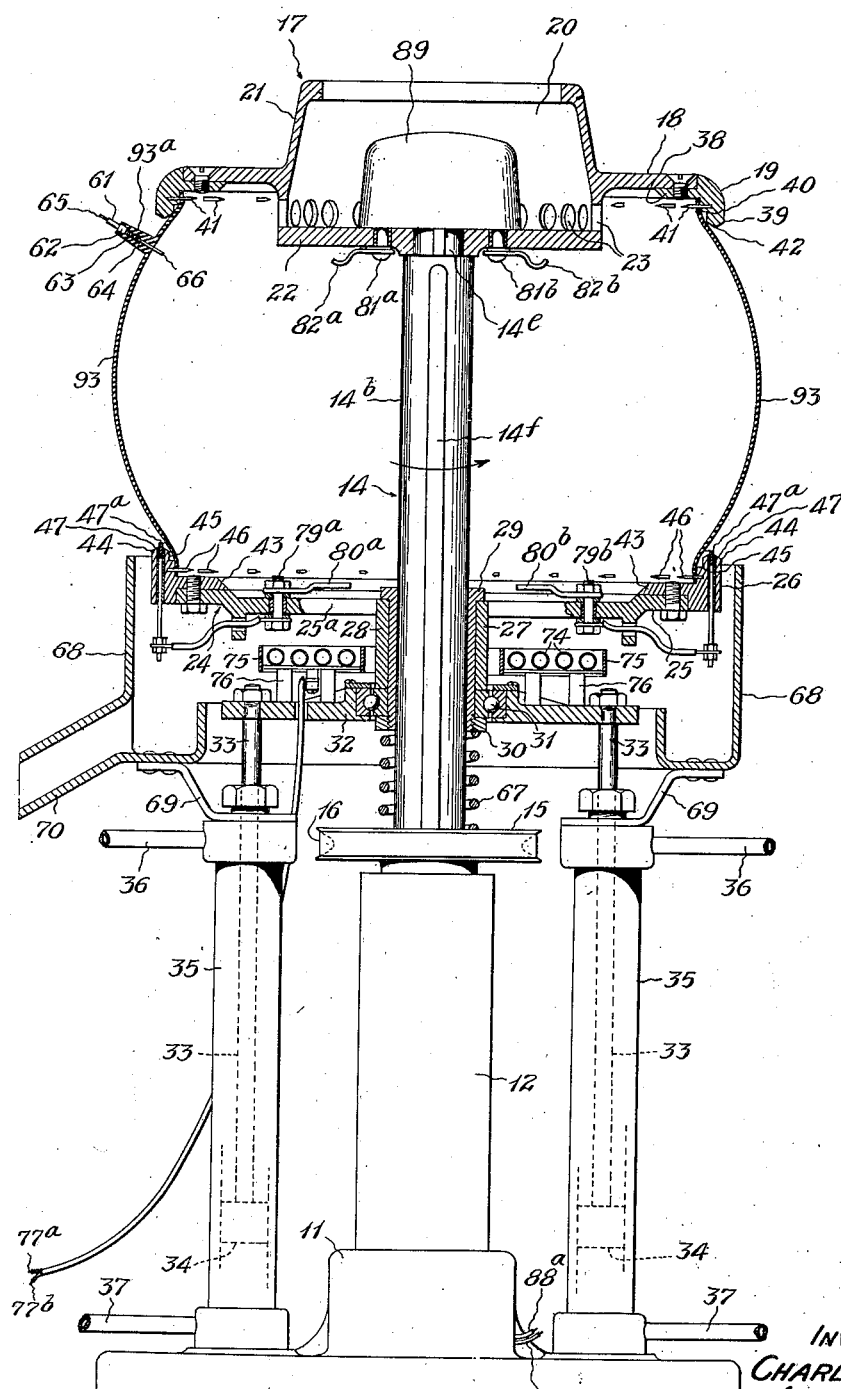
Fig. 5 is a view similar to Fig. 4 showing, however, a lower head structure moved upwardly, subsequent to the removal of the foraminous wall, and the central portion of the partially dehydrated layer or band of the latex deflected outwardly by centrifugal force, as occurs when the machine is rotated.
Figure 6:
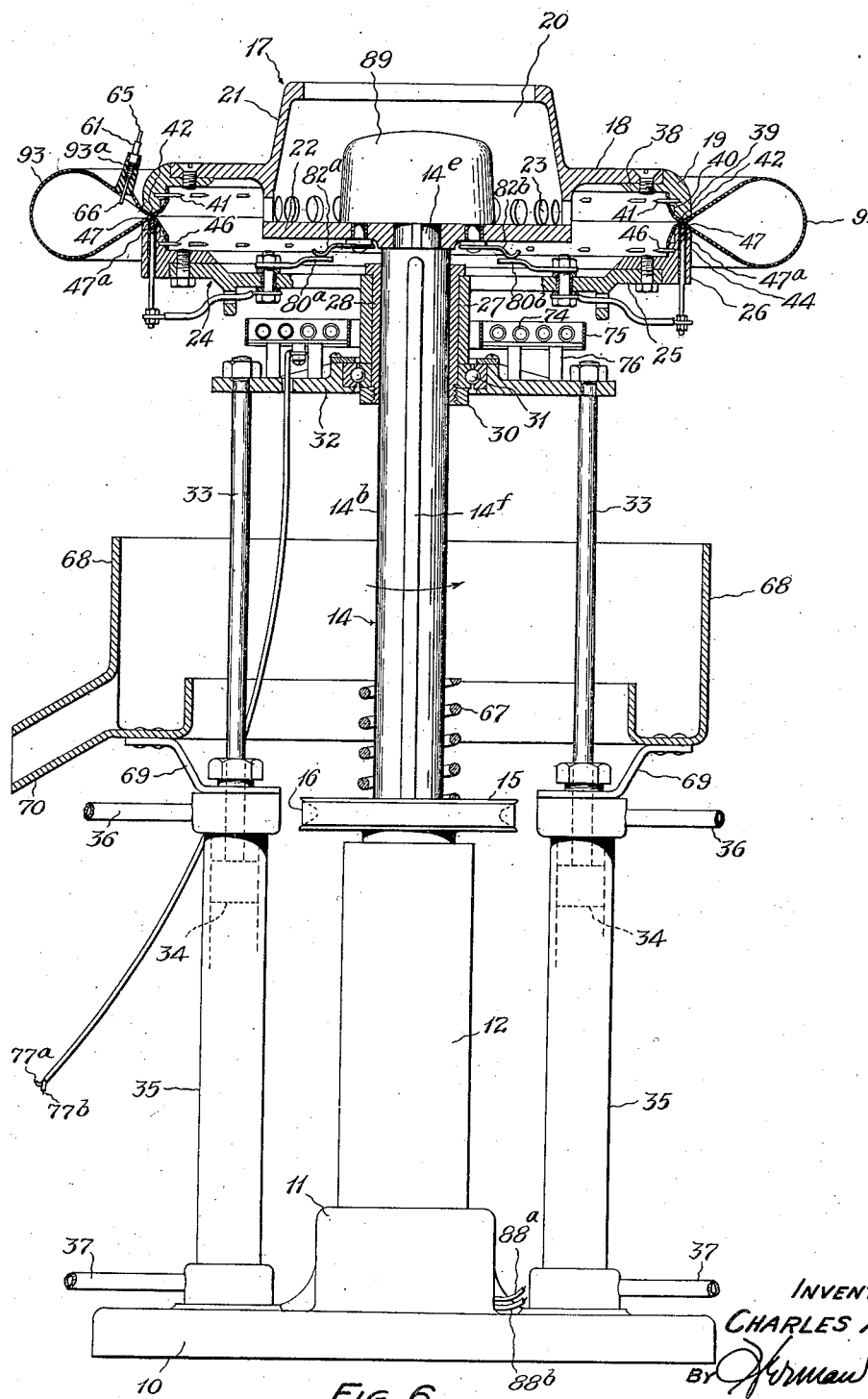
Fig. 6 is a view similar to Fig. 5 but showing the parts of the machine in the positions assumed substantially at the completion of the process of forming the sealing the annular latex tube, this view showing the tube just prior to the severing of the tube from the anchored portions of the latex band.

After the removal of the foraminous wall 48, the heads 17 and 24 are again set into rotation but at a relatively slower speed than before, and simultaneously with this rotation and progressively with the increase in speed, the lower head is moved toward the upper head. This action causes the radial portion or zone of the band to be forced gently outwardly by centrifugal force while the upper and lower ends of the layer or band 93 are restrained by the anchoring pins on the heads. An intermediate position of the parts of the apparatus and the layer or band 93 during this stage of the operation is shown in Fig. 5. In this process the latex is not stretched or thinned materially at the center to form the outer periphery, for the reason that, as the central bulging takes place, the ends are brought towards each other and the latex band is in fact re-formed without any detrimental stretching of any portion of the latex. This correlative rotation and bringing together of the heads continues until the parts reach the position shown in Fig. 6 where opposed peripheral circular areas adjacent the ends of the band 93 are pressed together by the anvil 42 and anvil 47 and knife 47a thus forming a closed annular tubular member. The contacting latex, being still in the formative or nascent state, flows together under the pressure and fuses together to form an integral union along the inner periphery of the tube.

At this stage of the operation the outer surface of the tube, due to its prolonged rotation through the air, has been sufficiently dehydrated and dried so that the completed tube may be handled. When the anvil 42 and electrical resistance knife 47a are thus adjacent each other, an electrical current is passed to the knife, heating it sufficiently to cut or sever the completely formed tube from the selvage or extreme ends of the original band which remain anchored to the pins on the heads. This current may be passed to the knife 47a substantially simultaneously with its contact with the anvil 42 thus making the sealing and the severing steps practically one continuous operation; or, as previously explained, the current may be passed to the knife at a predetermined time interval after the pressing together of the contacting areas.

It will be evident that the tube thus formed has air entrapped when the tube is sealed and that the pressure of the air enclosed in the tube will be sufficient to prevent the tube from collapsing.

It will also be obvious that additional air may be introduced into the completely formed tube through the valve nipple which was imbedded in the latex stem simultaneously with the formation of the tube. This air may be introduced into the tube either prior to or subsequent to the removal of the sealed tube from the machine.

This entrapped air, in effect, forms a fluid mandrel which facilitates the handling of the completely formed tube, as will be understood, and prevents its collapse with ordinary precaution, and thus avoids the adhering of opposed tacky walls to each other and the spoiling of the tube.

The above described operation from the time that the liquid latex is introduced into the machine until the completely formed tube is severed and may be removed from the machine, will ordinarily not require more than two minutes. The completely formed tube thus produced is subsequently cured by any known means.

The selvage ends of the layer 93 remaining anchored to the pins on the heads are easily removed by cutting or any other desired manner.

It will be understood that the preliminary saturation of the foraminous wall will be unnecessary for any except the first tube of a series, made on the apparatus, as the foraminous wall remains sufficiently saturated with coagulant from the preceding operation to prevent the passing through of the latex emulsion or its adherence to the cloth.

In the above description the complete series of steps from the introduction of the liquid latex to the severing of completely formed tubes have been enumerated. It will be evident that it is not necessary to form a complete tube to secure the benefits of some phases of this invention. For instance, latex bands may advantageously be formed by this process, and, in fact, in the apparatus disclosed. If such a band is to be formed the latex is deposited against the foraminous wall and coagulated and the wall is then removed, whereupon the band is severed from the anchored portions on the heads by means of an electrically heated knife or any equivalent device. This band forming process is especially advantageous for the formation of treads in which event the foraminous wall is formed with suitable recesses.

In the description of the above method it has been assumed that only a single layer of liquid latex is deposited and coagulated. I have found this procedure to be satisfactory for some purposes.

This method and apparatus is well adapted, however, for forming a "laminated" latex product in which a plurality of layers of liquid latex are successively deposited and coagulated, each layer forming an integrally fused union with the preceding layer. This procedure insures the elimination of any defects which might be caused by any localized irregularity or impurity which might occur in a single layer. This building up process is especially well adapted for the formation of bands in the form of tire treads where a relatively thick latex wall is required.

As is well known, latex is cured at relatively low temperatures and in a relatively short time. It is feasible with this device to so control the heat supplied by the heating elements 74 that the latex band, as shown in Fig. 1, may be given a partial cure. The top of the distributing chamber may be temporarily closed to insure the retention of the highly heated air within the chamber 91, during such partial curing process.

Modifications

A few modifications relating to the air vent nipple and stem will now be described in order to disclose different constructions and methods of incorporating the vent with the tube.

Fig. 10 is a view similar to Fig. 9 but illustrates a slightly different nipple 101. This nipple is not provided with a shoulder as is the nipple illustrated in Fig. 9 but is straight and is provided with a collar 102 of latex, rubber, or similar material, the outer end of which engages the shoulder 59 in the thimble 56 and thus prevents the radially outwardly movement of the nipple during the rotation of the drum 90. The nipple 101 is also provided with a temporary plug 103 of slightly different construction than the plug 64. The plug 103 is formed with an axial hole 104 closed at the inner end of the plug but communicating with a plurality of lateral passages 105 located in the plug a substantial distance interiorly of the foraminous wall 48. Inlet to the outer end of the hole 104 is closed by a spring controlled check valve 106. This construction provides a somewhat less expensive form of nipple due to the substitution of the rubber collar 102 for the enlarged metallic shoulder on the nipple. This construction further facilitates the introduction of additional air into the completely formed tube, as it is only necessary to apply the discharge outlet of an air hose to the outer end of the plug 103, without removing the plug. The lateral orientation of the passages 105 prevents the latex from entering and plugging the axial hole 104. The latex disposed around the rubber collar 102 forms a tight seal or bond with the outer surface of the rubber collar which is superior, in some respects, to a bond between latex and a metallic valve stem. For this reason it is contemplated, in this invention, to coat the entire exterior portion of the valve stem located within the thimble 56 with rubber, in some instances, and imbed this coated stem in latex; or, for some purposes, it is contemplated, to attach a rubber stem extension to a nipple and imbed the extension in latex in the manner described.

Fig. 11 illustrates the thickening or reinforcing at 110, of the layer 93, which reinforcing I propose to form integrally with the tube for those tires which are to be provided with a usual type of metallic valve stems. In the construction of tubes heretofore made, the tube wall is made of uniform thickness and additional patches of sheet rubber are vulcanized to these uniform walls. This thickening 110 is very easily produced by the formation of a recess 111 in the foraminous wall 48. The thickening 110 is connected with the main body of the tube by means of gradually tapering walls conforming with the tapered edges of the recess. A suitable opening for the usual valve stem can be formed in the thickened portion 110 to receive the brass stem as will be understood, and the valve stem can be inserted and secured to the thickened portion without patches.

Figures 12 and 13 illustrate a device for imbedding a brass valve stem of the usual type in the latex tube simultaneously with the formation of the tube. In these figures the brass valve stem is indicated at 120. This stem is formed with a flange 121. A temporary plug 122 is removably secured within the valve stem. The foraminous wall 48 is formed with a recess 123 in the center of which an opening 124 is formed. Spaced from the recessed portion of the foraminous wall is a plate bracket 125 also formed with an opening 126. The openings 124 and 126 are aligned and of suitable size to snugly receive the main body of the valve stem 120. The valve stem is inserted through these two openings and the valve stem is held in the desired position radially by means of a half nut 127 which is slidably mounted within the plate bracket 125. The threads 128 formed interiorly of the half nut engage the threads on the outside of the brass stem and thus prevent the axial displacement of the valve stem during the rotation of the drum. The latex is forced between the recess 123 and the flange 129 thus imbedding the valve stem firmly in the latex.

It will be evident that the scope of this invention is not limited to the particular product described nor to the exact method disclosed nor to the specific apparatus shown in the herein described embodiment.

Numerous modifications of the apparatus can be developed and it is considered unnecessary to illustrate further modifications of the apparatus in detail.

It will be obvious, for instance, that the formation of the tire valve integrally with the tube is not essential to the practice of the broad principles of this invention.

In its broader aspects, also, this invention is not limited to the formation of a hollow tubular member, as the steps used for producing an annular band of latex directly from liquid latex by centrifugal force and the apparatus disclosed for this purpose constitutes an essential phase of this invention.

Bands of various conformations at the outer periphery and substantially smooth cylindrical surface in their inner periphery, such for instance as tire treads, can readily be produced by providing corresponding conformations in the inner face of the foraminous wall.

It is also contemplated that this invention can be applied to the formation of gated individual tire valve stems separately from the tube, by forming the foraminous wall with a plurality of nipple receiving recesses annularly arranged with connecting passages or areas, formed in an annular band, these valve stems being later separated from each other and subsequently mounted on and vulcanized to tubes.

It will also be understood that tubes having a cross-sectional contour different from that disclosed may easily be produced by the herein described method and equivalent apparatus. For instance, it is contemplated that a band thicker at its central portion be produced by forming a recess or recesses in the inner face of the foraminous wall which will form a band, and subsequently a tube with added thickness on its outer periphery.

While I have shown only a single distributing chamber 20 in the embodiment disclosed, which distributes both the liquid latex and the coagulant, it is contemplated that separate distributing chambers, may be provided in the upper head, in order that the liquid latex may be distributed by one chamber and the coagulant by the other chamber.

Although the herein disclosed embodiment describes a method and apparatus in which the drum 90 rotates about a vertical axis, it is entirely feasible to carry out this invention in apparatus having drums disposed at other angles.

Likewise, although I describe apparatus in which the liquid latex is introduced into the upper end of the chamber 91, it is entirely feasible to introduce the latex into the chamber at any other elevation as for instance, at the bottom, as it will be obvious that liquid latex introduced into the bottom of the chamber will rise vertically upwardly on the inner surface of the foraminous wall and form a layer of uniform thickness under the influence of the centrifugal force, under suitable conditions.

The inner surface of the foraminous wall is shown as a true cylinder. There is a slight tendency for gravity to increase the thickness of the layer of latex at the lower edge of the cylinder. This is counteracted by the circumstance that the liquid latex is first applied to the upper zone of the wall and by the resistance of the surface of the wall to the downward flow of the liquid. If desired, it is contemplated that the inner surface of the foraminous wall may be made of parabolic, or other desired contour, to counteract the tendency of gravity to modify the thickness of the latex layer at any point.

Many other modifications of this invention and its application will naturally occur to those skilled in this art, and the present disclosures should therefore be considered as typical only, and I desire not to be limited to the exact product, method, and construction shown and described.

What I claim is:

1. Apparatus of the character described, including a pair of spaced heads, a foraminous substantially cylindrical wall removably interposed between the heads, said heads being provided with latex band anchoring means adjacent the ends of said wall, means adapted to centrifugally deposit, coagulate and partially dehydrate an endless band of latex upon the inner surface of said wall and upon said anchoring means, and means permitting the removal of the wall from said latex band while said band remains anchored to said spaced heads.

2. Apparatus of the character described including a pair of spaced rotatably mounted heads, a segmental cylindrical foraminous wall interposed between said heads, each of said heads having peripheral shoulder means adapted to engage said wall segments whereby the segments are prevented from moving outwardly by centrifugal force when the heads are rotated, and means for shifting said shoulder means whereby said segments are free to move outwardly.

3. Apparatus of the character described including a pair of spaced axially aligned rotatable heads, said heads being formed with opposed peripheral axially extending shoulder means, a foraminous wall interposed between said heads and seated within said opposed shoulder means, pressure means adapted to normally hold said wall seated in said shoulder means, and means adapted to increase the spacing of the heads whereby the wall is released from said shoulder means.

4. Apparatus for making inner tubes from annular bands of latex or the like, including a pair of axially spaced rotatable heads, means associated with said heads adapted to hold the ends of said annular band in fixed position relatively to the heads, peripheral anvils located exteriorly of said holding means, means adapted to rotate the band whereby the medial portion of the band is centrifugally deflected outwardly between the anvils, and means independent of said rotating means adapted to increase or decrease the space between the heads by moving at least one of said heads, whereby portions of the band may be pressed between the anvils.

5. Apparatus for making an inner tube from an annular band of latex or the like including opposed axially aligned heads each provided with means for holding one end of the band, peripherally disposed anvils located exteriorly of said holding means, said anvils being in juxtaposed relation, a circular knife associated with one of said anvils, means for deflecting the medial zone of said band outwardly between said anvils by centrifugal force, means for bringing said anvils together and engaging them with interposed portions of the band, and means for heating the circular knife.

6. Apparatus for making inner tubes of latex or the like, including a pair of spaced heads in vertical axial alignment, a segmental foraminous substantially cylindrical wall removably mounted between said heads forming a hollow cylindrical chamber with said heads, a plurality of anchoring elements adapted to anchor latex located interiorly of each of said heads adjacent the ends of said wall, means adapted to automatically hold said heads in engagement with said wall, circular anvils associated with each of said heads located radially outwardly of the foraminous wall and facing each other in juxtaposed position, means for rotating both heads in unison, means associated with one of said heads adapted, when rotated to introduce liquid centrifugally into the upper portion of said cylindrical chamber, means for introducing heat into the interior lower portion of the cylindrical chamber, means adapted to increase the space between said heads whereby the segmental foraminous wall may be removed, and adapted, upon the removal of the wall, to bring the anvils axially into contact with each other while the heads are rotating.

7. Apparatus for making inner tubes of latex or the like, including a pair of spaced heads in vertical axial alignment, a segmental foraminous substantially cylindrical wall removably mounted between said heads forming a hollow cylindrical chamber with said heads, a plurality of anchoring elements adapted to anchor latex located on each of said heads adjacent the ends of said wall, resilient means adapted to automatically hold said heads in engagement with said wall, circular anvils associated with each of said heads located radially outwardly of the foraminous wall and facing each other in juxtaposed position, one of said anvils comprising an electrical resistance element, means for rotating both heads in unison, means associated with one of said heads adapted, when rotated to apply liquid centrifugally to the upper portion of said cylindrical wall substantially uniformly about its periphery, means for introducing heated air into the interior of the lower portion of the cylindrical chamber, means adapted to increase the space between said heads whereby the segmental foraminous wall may be removed, and adapted, upon the removal of the wall, to bring the heads toward each other while said heads are rotating and means adapted to automatically apply electric current to said electrical resistance element.

8. Apparatus for making an inner tube from an annular band, including a pair of spaced rotatably mounted heads, means associated with said heads for holding the band interposed between the heads, a segmental cylindrical wall interposed between said heads exteriorly of the band, each of said heads having peripheral shoulder means adapted to engage said wall segments whereby the segments are prevented from moving outwardly by centrifugal force when the heads are rotated, and means for shifting said shoulder means whereby said segments are free to move outwardly.

9. Apparatus for making an inner tube from an annular band, including a pair of spaced axially aligned rotatable heads, means for holding the annular band interposed between the heads, said heads being formed with opposed peripheral axially extending shoulder means, a cylindrical wall interposed between said heads and seated within said opposed shoulder means and disposed exteriorly of the band, pressure means adapted to normally hold said wall seated in said shoulder means, and means adapted to increase the spacing of the heads whereby the wall is released from said shoulder means.

10. Apparatus of the character described, including a pair of spaced heads, a substantially cylindrical wall removably interposed between said heads, means adapted to centrifugally form an endless band of latex upon the inner surface of said wall, means adapted to anchor the ends of said band to the heads at locations beyond the ends of the wall as the band is formed, and means adapted to permit the removal of said wall from said band and heads while the band remains fastened to the heads.

11. Apparatus of the character described, including a pair of spaced heads, a substantially cylindrical foraminous wall removably interposed between said heads, means adapted to centrifugally form an endless band of latex upon the inner surface of said wall, means adapted to anchor the ends of said band to the heads at locations beyond the ends of the wall as the band is formed, and means adapted to permit the removal of said wall from said band and heads while the band remains fastened to the heads.

12. Apparatus of the character described including a pair of spaced axially aligned rotatable heads, a wall removably interposed between said heads, means for centrifugally forming an endless latex band upon the inner surface of the wall, means associated with said heads for automatically anchoring said band to said heads while said band is being formed, and means for increasing the spacing of the heads while the latex is anchored to the heads whereby the latex is axially stretched.

13. Apparatus for producing a latex band from a liquid dispersion of latex, including a pair of vertically spaced axially aligned heads and a foraminous wall interposed between said heads forming a hollow substantially cylindrical chamber, means associated with the upper head adapted to introduce liquids into the chamber, means for rotating the chamber, and means for introducing heated air into the lower portion of the chamber.

14. Apparatus of the character described including a pair of spaced axially aligned heads, a cylindrical wall interposed between said heads, said heads each being formed with a plurality of anchoring elements adjacent the ends of said wall, means for rotating said heads and said wall, and means for centrifugally forming a layer of latex against the wall and the anchoring elements, whereby the anchoring elements are automatically imbedded in the latex.

15. Apparatus for making inner tubes from annular bands, including a pair of axially spaced rotatable heads, means associated with said heads, adapted to hold the ends of said annular band, peripheral anvils located adjacent said holding means, means adapted to rotate the band whereby the medial portion of the band is centrifugally deflected outwardly between the anvils, and means adapted to decrease the space between the heads whereby opposed portions of the band are pressed between the anvils to form an annular tube, and knife means adapted to sever the tube from the said ends of the annular band.

16. Apparatus for making inner tubes from annular bands, including a pair of axially spaced rotatable heads, means associated with said heads adapted to hold the ends of said annular band, peripheral anvils located adjacent said holding means, means adapted to rotate the band whereby the medial portion of the band is centrifugally deflected outwardly between the anvils, means adapted to decrease the space between the heads whereby opposed portions of the band may be pressed between the anvils to form an annular tube, means associated with at least one of said anvils adapted to sever the tube from the said ends of the annular band, and means adapted to actuate said severing means when said opposed portions of the band are pressed between the anvils.

17. Apparatus for making inner tubes from annular bands, including a pair of axially spaced rotatable heads, means associated with said heads adapted to hold the ends of said annular band, peripheral anvils located adjacent said holding means, means adapted to rotate the band whereby the medial portion of the band is centrifugally deflected outwardly between the anvils, means adapted to decrease the space between the heads whereby opposed portions of the band may be pressed between the anvils to form an annular tube, an electrical resistance element associated with one of said anvils and switch mechanism actuated by one of the heads adapted to automatically close an electrical circuit including said electrical resistance element.

CHARLES A. TOUT.